Patented Jan. 18, 1927.

1,614,698

UNITED STATES PATENT OFFICE.

JOB MORTEN AUGUST STILLESEN, OF NIAGARA FALLS, NEW YORK.

PROCESS OF PREPARING UREA.

No Drawing. Application filed June 16, 1923. Serial No. 645,907.

This invention relates to process of preparing urea, and has especial reference to the production of urea and derivatives thereof in commercial quantities for fertilizer purposes from raw lime nitrogen or dicyandiamid. This invention will be useful for compounding fertilizers, and for the production of ammonia or ammonia salts for technical uses. In connection with compounded fertilizers, it is desirable to have a soluble nitrogen product which will not revert available phosphates when mixed therewith; which will have a controllable percentage of carbonates of lime, both hydrated and unhydrated, normal and basic; and which can be used as a top dressing on soil or plants, as distinguished from raw lime nitrogen which is dusty and cannot be compounded with available phosphates, and which has to be applied and plowed under sometime before planting in order to be decomposed by the soil bacteria present in humus into available forms of nitrogen. The products of this invention obtain the above novel and desirable results by means of a novel process.

I have found that calcium cyanamid in raw lime nitrogen can be converted into urea by treating with water and carbon dioxid, the heat evolved by the reaction of the calcium oxid in the raw lime nitrogen with carbon dioxide being sufficient to produce steam or to vaporize the water, and this with additional carbon dioxid decomposes the cyanamid to produce urea. If it is preferred to use sufficient water to convert the nitrogen into ammonia—about 1.6 of water to each part of ammonia—wet lime nitrogen is put into a closed vessel connected to a controlled source of carbon dioxid, preferably under expansion, as from solid or liquid to gas. The carbon dioxid reacting with the wet calcium oxid evolves heat sufficient to free ammonia, which in the nascent state combines with the carbon dioxid to form urea. The heat necessary for the liberation of ammonia may be supplied in other ways than by the action of water on calcium oxid, and by supplying the proper amount of heat, such liberation of ammonia will take place in the pure calcium cyanamid as well as in lime nitrogen containing the same.

The reactions are:

(1) $CaCN_2 + heat + 3H_2O = CaCO_3 + 2NH_3$
(2) $2NH_3 + CO_2 + heat = CO(NH_2)_2 + H_2O$ so that in adding water, less than the theoretical amount may be used, as the water set free by this reaction will be utilized, thus making the reaction progressive. If dicyandiamid is present, it is also converted into urea, according to the reactions:

(3) $C_2H_4N_4 + 4H_2O + heat = 4NH_3 + 2CO_2$
and
(4) $4NH_3 + 2CO_2 + heat = 2CO(NH_2)_2 + 2H_2O$
or
(5) $C_2H_4N_4 + 2H_2O = 2CO(NH_2)_2$ In treating dicyandiamid, only about half of the theoretical water need be added, since the other half is supplied in the formation of urea by equation (4), similarly to equation (2) where urea is formed. The heat evolved by these reactions can be regulated by the amount of expanding carbon dioxid supplied, so that there will be no decomposition of the end product. Although equation (5) is operative without adding carbon dioxid, better conversion is obtained by adding it at the end, and also in equation (6) hereinafter.

A preferred process for obtaining dicyandiamid in large commercial quantities is to treat raw lime nitrogen with hot water at about 90° C. by stirring the solid material into the water with the resulting dicyandiamid in solution. Some lime is also dissolved. After filtering, the clear liquor can be treated with carbon dioxide to precipitate the lime and evaporation of the filtrate gives practically pure dicyandiamid. This procedure avoids excess of lime in the end product.

I have discovered that the foregoing reactions (1), (2); and (3) and (4) or (5) are more complete and materially increased in speed, giving a better fertilizer product, if conducted in the presence of an accelerating or catalyzing substance. Such substances are salts of potassium and sodium, especially the former because of their value in the end fertilizer product. Besides such soluble potassium compounds as the hydroxide chlorid, oxid, carbonate, may be used, also carnallite, polyhalite, kieserite, etc. Also such materials as orthoclase, kainite, leucite, alunite, cryolite, muscovite, kalinite, etc., are suitable.

The preferred process is to treat dicyandiamid according to reactions (3) and (4), or (5) mixed with 1% and upwards to the percentage desired in the end product, of the accelerating substance, such as the potassium compound, and heated for 20 minutes or more at 150° C. In order to obtain this temperature, the solution must, of course be subjected to pressure, but the pressure is not of itself necessary to the reaction. The conversion is in excess of 96%, but above 90% is satisfactory as dicyandiamid below 10% is harmless to plants when mixed with urea or other easily absorbed nitrogen compounds. Mixed potassium salts may be used, and in several instances, an insoluble or slowly soluble material containing a potassium salt will, by the treatment be converted to a soluble or more soluble form. For example, alunite will be converted to potassium sulphate. If the end product, containing unconverted dicyandiamid be mixed with phosphoric acid as in superphosphate or double superphosphate, the dicyandiamid is converted to urea and urea phosphate, constituting a novel potassium, nitrogen, and phosphorus fertilizer material. By treating dicyandiamid with potassium carbonate, the reaction is (6) $C_2H_4N_4 + K_2CO_3 + 2H_2O + \text{heat} =$ 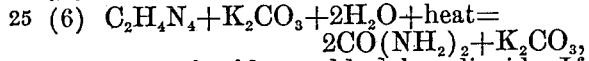
$2CO(NH_2)_2 + K_2CO_3$, it being preferable to add carbon dioxid. If potassium hydroxide is used, conversion to carbonate or bicarbonate by addition of carbon dioxid is desirable.

If, for instance, a fertilizer mixture is wanted containing 9 units of phosphoric acid, 2 units of nitrogen and 2 units of potash ($K_2O$), 100 pounds of dicyandiamid are mixed with 64 pounds of potassium chlorid, which, after the heat treatment, are mixed with 400 pounds double-superphosphate, giving a mixture of 564 pounds, containing more than 46% of actual fertilizer materials, and only needing to be added 1436 pounds of any "filler" to give one ton of mixed fertilizer of the composition above stated.

As another way to reduce the percentage of calcium carbonate in a fertilizer material, lime nitrogen is treated with hot water to obtain dicyandiamid, and the solution of the latter decanted off and concentrated to leave about the amount of water necessary for conversion, then treated as before in the presence of calcium oxid, heat, and the accelerator. This solution or wet or dry dicyandiamid can be mixed with raw lime nitrogen of such quantity as to produce the desired heat and percentage of calcium carbonate in the end product, and then treated as before with heat, and the accelerator. In both cases, addition of carbon dioxid is preferable. Instead of using lime nitrogen for mixing with the wet dicyandiamid, calcium oxid can be used, and then treated with expanding carbon dioxid, at or below 60° C., to form normal and basic carbonates of calcium with evolution of heat. Such a product can have as low as one part of nitrogen to 0.61 part of calcium, instead of one part of nitrogen to 2.48 parts of calcium as in commercial calcium cyanamid, of which latter not over 60 pounds can be used to a ton of mixed fertilizer, because the high percentage of calcium compounds, such as oxid or hydroxide, reverts soluble phosphoric acid to insoluble. In other words about four times as much nitrogen can be used in mixed fertilizer by using my product.

The temperature for the formation of urea is around 135° C. and upwards, a higher temperature being preferred when the accelerator is used.

When raw lime nitrogen is used as a fertilizer, a toxic action has been observed which by some authorities is considered to be due to the presence of CaC, but this compound, if present, is decomposed by the treatment herein described and its toxic effect, if any, eliminated.

I have further found that dicyandiamid, with or without being mixed with calcium cyanamid, can be mixed with superphosphate, or dicalcium phosphate, or both, and treated with water, carbon dioxid, and heat to form ammonium phosphate $(NH_4)_3PO_4$, or the urea formed may combine with phosphoric acid to give urea phosphate, $CO(NH_2)_2.H_3PO_4$. Also rock phosphate can be used. In either case the calcium appears as carbonate, whether normal or basic, hydrated or unhydrated, depending on the conditions present.

It will be observed that according to equations (3) and (4) or (5) or (6), no additional carbon dioxid is required for converting the dicyandiamid molecule into the urea molecule, and when the reaction takes place in the absence of lime nitrogen, or of calcium oxid, the addition of carbon dioxid is unnecessary.

While I intend to obtain urea as the principal end product of this invention, other derivatives of dicyandiamid and of urea may be present, of which a number are known.

While the foregoing processes (1) to (6) can be carried out without the accelerator and at various temperatures and pressures, by use of the accelerator within the stated temperatures, the time of conversion is reduced from as much as four hours to as low as twenty minutes, and the potash units in the end product have both sales value and beneficial result. A further advantage of this invention is that whereas raw lime nitrogen is bulky and has objectionable characteristics as stated, it can also only be made economically in large plants with cheap electrical power. Dicyandiamid obtained therefrom at the works can be shipped at much lower cost to operators of this process who can thus work on a smaller scale in or adjacent the numerous plants of fertilizer compounders whose operations must be relatively local because of freight rates. Although dicyandiamid has been known for years, it is not an article of commerce and has no technical use in the fertilizer industry, and has had only slight mention for use in dyeing and explosives.

I claim:

1. The process which comprises treating calcium cyanamid with water to convert a substantial proportion thereof into dicyandiamid, separating the latter, and heating it with water in the presence of carbon dioxid to form urea.

2. The process which consists in treating calcium cyanamid with hot water to convent it substantially into dicyandiamid and form a solution thereof, separating and concentrating said solution, adding raw lime nitrogen, and treating with carbon dioxid.

3. The process which consists in treating calcium cyanamid with hot water to form dicyandiamid and produce a solution thereof, separating and concentrating said solution, adding a controlled proportion of calcium oxid, and treating with carbon dioxid to convert the dicyandiamid into urea.

4. The process of producing a fertilizer containing urea and calcium compounds which comprises subjecting a mixture of dicyandiamid and calcium oxide in controlled proportions to the action of water and carbon dioxide gas at 135° C. and upwards.

5. The process which comprises combining nascent ammonia and expanding carbon dioxid and regulating the supply of carbon dioxid to maintain the temperature within limits favorable to such combination.

6. The method of maintaining a proper combining temperature in combining carbon dioxid and ammonia, which consists in releasing the carbon dioxid while expanding into the ammonia.

7. The method in maintaining a proper combining temperature in combining carbon dioxid and ammonia, which consists in releasing the carbon dioxid while expanding into the ammonia and in regulating the quantity of carbon dioxid so released.

8. The method of forming urea which comprises heating dicyandiamid with water at 135° C. and upwards.

9. The method of forming urea which comprises heating dicyandiamid with water in the presence of carbon dioxide at 135° C and upwards.

10. The method of forming urea which comprises heating dicyandiamid with water at 135° C. and upwards in the presence of carbon dioxide.

11. The process of forming urea which consists in heating dicyandiamid with water in the presence of an accelerating substance.

12. The process of forming urea which consists in heating dicyandiamid with water in the presence of a salt of an alkali metal.

13. The process of forming urea which consists in heating dicyandiamid with water in the presence of a potassium salt.

14. The method of forming urea which comprises heating dicyandiamid with water at 135° C. and upwards in the presence of accelerating substance.

15. The process of forming urea which comprises heating dicyandiamid with water at 135° C. and upwards in the presence of a salt of an alkali metal.

16. The process of forming urea which comprises heating dicyandiamid with water at 135° C. and upwards in the presence of a potassium salt.

17. The process of making a fertilizer material comprising urea and a potassium salt consisting in heating dicyandiamid with water at 135° C. and upwards, and a potassium salt.

18. The method of producing a fertilizer which consists in heating dicyandiamid with water at 135° C. and upwards in the presence of an accelerator to effect the conversion of a portion thereof into urea, and adding to the reaction mixture a phosphoric acid compound.

19. The process of forming urea which consists in treating a compound containing the cyanamid group with heat above 135° C. and water in the presence of an accelerator.

20. The process of forming urea which consists in treating a compound containing the cyanamid group with carbon dioxid and water in the presence of a potassium salt at a temperature above 135° C.

21. The process of forming urea which consists in treating a compound containing the cyanamid group with expanding carbon dioxid and water in the presence of a potassium salt at a temperature above 135° C.

22. The method of forming urea which consists in heating dicyandiamid with water in the presence of a potassium salt to a temperature above 135° C. while introducing carbon dioxide into the reaction mixture.

23. The method of forming urea which consists in heating dicyandiamid with water in the presence of a potassium salt to a temperature above 135° C. while expanding carbon dioxide into the reaction mixture.

Signed at New York, in the county of New York and State of New York, this 15th day of June, A. D. 1923.

JOB MORTEN AUGUST STILLESEN.